United States Patent [19]

Whitney et al.

[11] Patent Number: 4,662,938
[45] Date of Patent: May 5, 1987

[54] RECOVERY OF SILVER AND GOLD

[76] Inventors: John W. Whitney, P.O. Box 20579; John H. Templeton, 6200 Meadowood Mall Cir., #62, both of Reno, Nev. 89502

[21] Appl. No.: 660,011

[22] Filed: Oct. 11, 1984

[51] Int. Cl.$^4$ ............................................. C22B 11/00
[52] U.S. Cl. ................................ 75/118 R; 75/101 R; 75/101 BE; 75/114; 75/109; 75/115; 75/117; 204/61; 204/64 R; 423/27; 423/38; 423/39; 423/41; 423/42; 423/45; 423/46; 423/100; 423/103
[58] Field of Search ...................... 75/118 R, 111, 114, 75/108, 101 R, 109, 117, 115, 101 BE; 423/38, 39, 40, 42, 45, 103, 27, 565, 41, 46, 100; 204/61, 64 R

[56] References Cited

U.S. PATENT DOCUMENTS

| | | | |
|---|---|---|---|
| 1,434,087 | 10/1922 | Christensen | 204/66 |
| 1,435,891 | 11/1922 | Christensen | 423/103 |
| 1,441,065 | 1/1923 | Christensen | 204/66 |
| 1,539,714 | 5/1925 | Christensen | 75/114 |
| 1,852,044 | 4/1932 | Drapeau, Jr. | 423/106 |
| 3,798,026 | 3/1974 | Milner et al. | 423/38 |
| 3,880,653 | 4/1975 | Hougen | 423/565 |
| 3,929,597 | 12/1975 | Cottam et al. | 204/66 |
| 3,961,941 | 6/1976 | Baker et al. | 75/101 R |
| 3,973,949 | 8/1976 | Goens et al. | 75/112 |
| 4,011,146 | 3/1977 | Coltrinari et al. | 204/66 |
| 4,082,629 | 4/1978 | Milner et al. | 204/66 |
| 4,083,921 | 4/1978 | Wesely | 423/55 |
| 4,337,128 | 6/1982 | Haakansen et al. | 423/38 |
| 4,439,235 | 3/1984 | Simpson | 423/27 |

OTHER PUBLICATIONS

Murphy, J. E., et al., "Recovery of Lead from Galena by a Leach Electrolysis Procedure," Bureau of Mines, Report of Investigations 7913, 1974.
Haver, F. P., et al., "Ferric Chloride-Brine Leaching of Galena Concentrate," Bureau of Mines, Report of Investigations 8105, 1976.
Haver, F. P., et al., "Recovery of Lead from Lead Chloride by Fused-Salt Electrolysis," Bureau of Mines, Report of Investigation 8166, 1976.
Wong, M. M., et al., "Lead Metal by Ferric Chloride Leaching of Galena and Fused-Salt Electrolysis of Lead Chloride," Bureau of Mines, 1978.
Um, R. T., et al., "The Recovery of Lead from Sulfide Concentrates Using a Chlorination/Brine Leach/Electrolysis Process," *Hydrometallurical Recovery From Concentrates*, vol. 1, Chapter 10, pp. 109–113.
Herrick, R. L., "The Malm Dry Chlorination Process," *Mines and Minerals*, vol. 30, pp. 370–374, Jan. 1910.
Ionides, S. A., "The Dry Chlorination of Complex Ores," *Mining and Scientific Press*, pp. 781–787, May 27, 1916.
Haver, F. P., et al., "Improvements in Ferric Chloride Leaching of Chalcopyrite Concentrate," Bureau of Mines, Report of Investigations 8007, 1975.
Salmon, Paul, "Leach Purification, and Cadmium Plants," *E&MJ*, pp. 74–77, Jul. 1980.
Brinkman, R. L., "Leaching, Purification, and Cadmium Recovery," *C&MJ*, pp. 104, 113–114, B-77, B-83, B-122, B-132, B-142-3, Sep. 1981.

*Primary Examiner*—John Doll
*Assistant Examiner*—Robert L. Stoll
*Attorney, Agent, or Firm*—Sheridan, Ross & McIntosh

[57] ABSTRACT

This invention provides processes for selectively recovering silver and gold values from feed materials containing both precious metals, and comprises leaching the feed material with a hot ferric chloride-acid brine leach solution for a time sufficient to dissolve the silver, but wherein the gold is not dissolved and remains with the solid residue. The silver-containing ferric chloride-acid brine leachate is separated from the solid residue containing the gold. The leach solution is then cooled to precipitate the silver as silver chloride. The solid residue containing the gold is then leached with hypochlorous acid to dissolve the gold, and after separating the solids form the gold-containing hypochlorous acid leach solution, the gold is precipitated by contacting the solution with sulfur dioxide. The silver chloride may be further processed in a fused salt electrolysis step at or above the melting point of silver to produce a substantially pure silver and chlorine gas. The chlorine gas can then be used in regenerating the spent ferric chloride-acid brine leach solution.

13 Claims, 1 Drawing Figure

SILVER-GOLD PRECIPITATE REFINERY-BLOCK DIAGRAM

RECOVERY OF SILVER AND GOLD

TECHNICAL FIELD

This invention is in the field of hydrometallurgy, and particularly relates to processes for the selective recovery of high purity silver and gold from Merrill-Crowe process precipitates and electrolytic sludges.

BACKGROUND OF THE INVENTION

Silver and gold recovery from precious metal ore deposits have historically been accomplished by treating the precious metal ore with a cyanide solution to dissolve and separate the silver and gold values from the ore gangue, with subsequent processing of the silver and gold cyanide leach solution to recover the precious metals. The Merrill-Crowe process involves digesting a crushed and ground precious metal ore with a cyanide solution to dissolve the silver and gold present in the ore. The cyanide solution containing the dissolved precious metal values is then contacted with zinc dust to precipitate the silver and gold as finely divided metallic particles. The silver and gold metallic particles are recovered by a filter press in the form of a sludge. The sludge, often termed Merrill-Crowe precipitate, in addition to the silver and gold, contains impurities, such as zinc, copper, and iron, and thus is processed by fire refining to produce a dore metal product containing both the silver and gold. The dore metal must be further refined in a number of process steps to separate the precious metals into high purity silver and gold. This known process for recovery of precious metals from the Merrill-Crowe sludge has the disadvantage of involving a number of complex steps and the limitation of processing both silver and gold together into a product which requires refining for separating into high purity silver and gold. A further disadvantage are the environmental problems associated with pyrometallurgy.

SUMMARY OF THE INVENTION

It is the object of this invention to provide simplified and economical processes for the recovery of high purity silver and gold from a particulate feed material containing both precious metals.

This invention provides processes for selectively recovering silver and gold values from feed materials containing both precious metals, and comprises leaching the feed material with a hot ferric chloride-acid brine leach solution for a time sufficient to dissolve the silver, but wherein the gold is not dissolved and remains with the solid residue. The silver-containing ferric chloride-acid brine leachate is separated from the solid residue containing the gold. The leach solution is then cooled to precipitate the silver as silver chloride. The solid residue containing the gold is then leached with hypochlorous acid to dissolve the gold, and after separating the solids from the gold-containing hypochlorous acid leach solution, the gold is precipitated by contacting the solution with sulfur dioxide.

In the preferred embodiments, the silver chloride is further processed in a fused salt electrolysis step at or above the melting point of silver to produce a substantially pure silver and chlorine gas. The chlorine gas can then be used in regenerating the spent ferric chloride-acid brine leach solution.

DETAILED DESCRIPTION OF THE INVENTION

Figure 1:
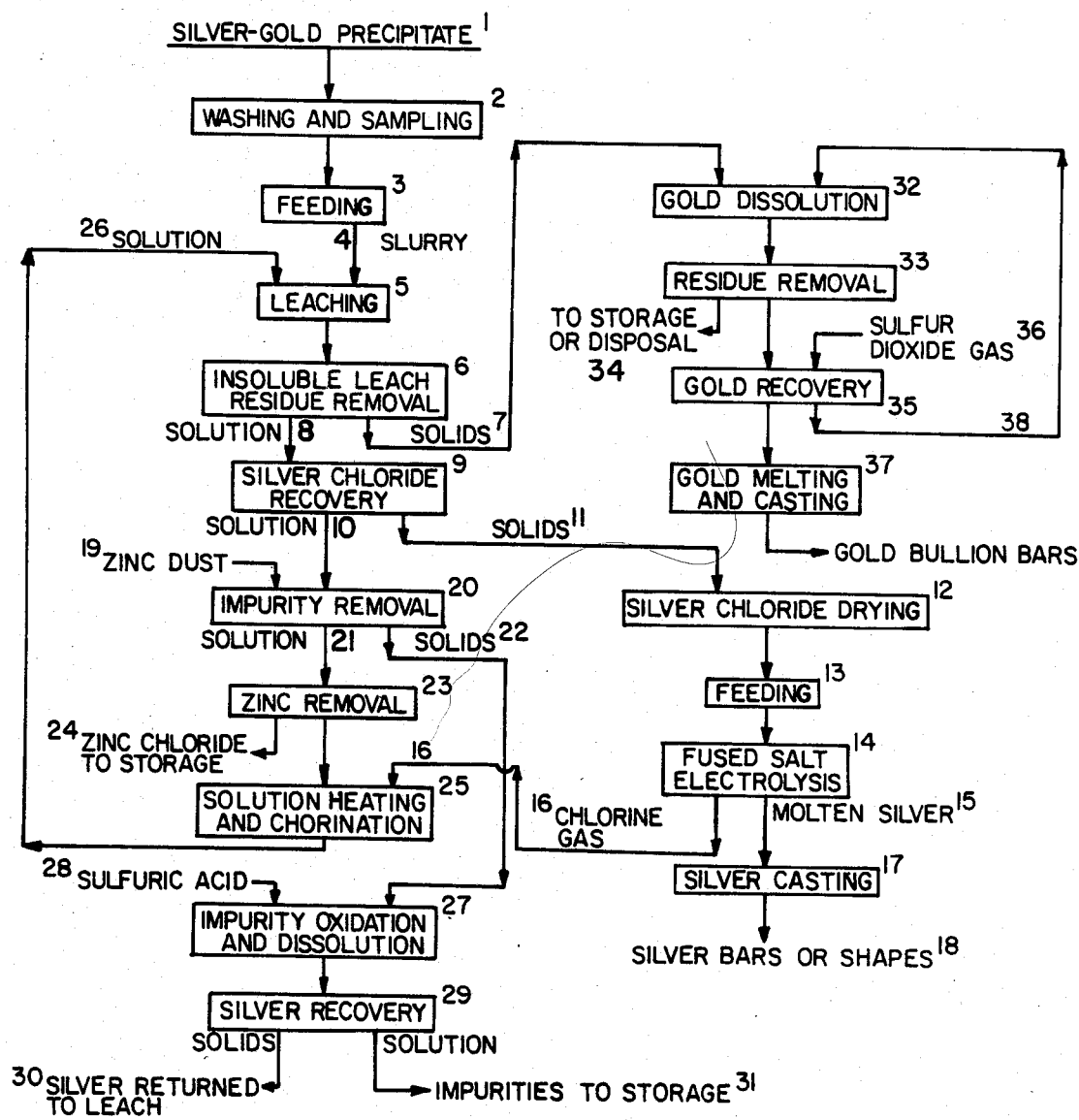
FIG. 1 is a general diagrammatic representation of one embodiment of the present invention.

Feed material useful in the practice of the present invention may comprise precipitates or sludges typically containing various amounts of silver and gold. A preferred feed material is the silver and gold metallic precipitate from the Merrill-Crowe process. Other suitable feed materials may comprise precious metal electrolytic sludges.

According to the present invention there is provided a process for the recovery of silver and gold values involving leaching the feed material with a hot ferric chloride-acid brine solution for a time sufficient to dissolve the silver, separating the silver-containing solution from the gold residue and recovering silver as silver chloride by cooling the leachate solution. The gold is recovered from the residue by contacting the gold-containing solid residue with hypochlorous acid to dissolve the gold, then separating the gold-containing acid from the remaining waste solids and precipitating gold by contacting the acid leachate with sulfur dioxide.

The ferric chloride-acid brine leach solution comprises ferric chloride, hydrochloric acid, and sodium chloride in a concentration capable of readily dissolving the silver when heated. In the ferric chloride-acid brine leach solution, almost all metals except gold will also typically dissolve into the leach solution. The gold values will not solubilize and will remain with the solid residue. Sufficient ferric chloride-acid brine leach solution must therefore be added to the feed material to dissolve the metallic silver and other dissolvable metals. Necessarily then, the percentage of ferric chloride-acid brine leach to feed material will vary according to the silver and dissolvable metals present. A typical ratio of gallons ferric chloride acid-brine leach to pounds feed material is from about 10 gal/lb. to about 36 gal/lb. The leach solution generally contains up to about 30 g/l ferric ion; and up to about 20.0 g/l ferrous ion; and preferably contains about 10 g/l ferric ion to about 20 g/l ferric ion and about 3 g/l ferrous ion to about 11 g/l ferrous ion; from about −0.5 to about 7.0 apparent pH in added HCl, preferably from about 0.0 to about 3.0 apparent pH in added HCl; and up to about 300 g/l NaCl; and preferably from about 100 to about 250 g/l NaCl. The numerical ranges specified herein are given in round figures and as will be understood by those skilled in the art, variations above or below these ranges may be operative and are within the scope and spirit of this invention.

In the preferred embodiment, the feed material, prior to the ferric chloride-acid brine leach, is sampled for percent metals. If a Merrill-Crowe precipitate is used as the feed material, it will typically contain some cyanide, and therefore, the feed should be washed with water to remove any of the cyanide present. In addition, if the feed material contains any moisture, the feed should be sampled for percent moisture, with corresponding adjustments in the amount of the ferric chloride-acid brine leach solution.

The dissolution of the silver is accomplished by leaching the feed material with the ferric chloride-acid brine solution at a temperature of about 50° to about 110° C. preferably about 95° C. and for a time sufficient to dissolve the silver present in the feed material. Typically, the leach is conducted with constant agitation of the leach solution, and for a total time of about 5 minutes to about 6 hours. At these leach conditions, approximately 90% to 100% of the silver will dissolve.

In one embodiment of this invention, the incoming feed material is advantageously pretreated with unheated ferric chloride-acid brine leach solution and vigorously agitated to form a slurry. This slurry is then leached with the hot ferric chloride-acid brine leach solution, as described above.

In the preferred embodiment, after the hot ferric chloride-acid brine leach, the leached feed material and acid solution remain in contact at about 95° C. for about 1 hour to about 24 hours to allow the solids to settle and thicken. After this thickening time, the solids are separated from the silver-containing acid brine leach solution, according to conventional means known in the art, typically by filtration.

The hot ferric chloride-acid brine leach solution contains the dissolved silver as silver chloride. In the preferred embodiment, the silver chloride is recovered by cooling the hot acid brine leach solution, preferably to a temperature of about 20° C., to precipitate the silver chloride. The silver chloride can then be separated from the leach brine solution according to means known in the art, typically by filtration. An alternative to cooling and liquid/solid separation is the precipitation of silver by cementation with a more anodic metal, e.g., copper or zinc, followed by a liquid/solid separation.

In the preferred embodiment, precipitated silver chloride is next washed and dried and fed to a fused-salt cell where an electric current separates the silver chloride into silver and chlorine gas. A novel feature of this invention involves operation of the cell above the melting point of silver (961° C.), thus enabling the molten silver to be drawn off continuously. This cell may be operated between about 961° C. and about 2200° C. and is preferably operated between about 961° C. and about 1200° C. Due to the separation process, the precipitation process, and the high temperature electrolysis, the molten silver will typically have a minimum purity of 99.99% silver and 0.01 percent impurities. The chlorine gas is recycled as described below.

The gold is recovered by leaching the solid residue remaining after the ferric chloride-acid brine leach with a hypochlorous acid solution. The reactions taking place are as follows:

$$2Au + Cl_2 \rightarrow 2AuCl(c)$$

$$2AuCl(c) + Cl^- \rightarrow AuCl_2^-(aq)$$

$$2AuCl(c) + Cl^- + Cl_2 \rightarrow AuCl_4^-(aq)$$

In one embodiment of this invention, the hypochlorous acid solution is produced by bubbling chlorine gas into an aqueous solution in which the chlorine gas will dissolve to form hypochlorous acid. The gold will dissolve in the hypochlorous acid solution. The solid residue and the hypochlorous acid solution containing the dissolved gold are separated, typically by filtration. The gold can then be precipitated from the acid solution by bubbling sulfur dioxide gas through it. The sulfur dioxide reacts with auric chloride as follows:

$$AuCl_4^-(aq) + SO_2 + 2H_2O \rightarrow AuCl_2^-(aq) + H_2SO_4 + 2HCl$$

$$AuCl_2^-(aq) + SO_2 + 2H_2O \rightarrow Au(c) + H_2SO_4 + 2HCl$$

The gold precipitate and solution are then separated, according to means known in the art, typically by filtration. The gold precipitated by this means will have a typical minimum purity of 99.9% gold and 0.1% impurities.

Advantageously, the ferric chloride-acid brine leach solution remaining after silver chloride precipitation can be recycled for reuse in the solubilization of silver. Excess quantities of impurities, typically iron, mercury, copper, zinc, and any metals which dissolve in the acid brine leach solution should first be removed from the solution, for example, by cementation with zinc dust. As zinc is added to the solution and dissolves, the iron, mercury and copper and other impurities will precipitate. These impurities can be filtered from the solution. Typically, the precipitated impurities will contain a quantity of silver, which can be recovered. The impurities are then heated at a temperature of about 400° C. to oxidize the copper. Then the oxidized copper, zinc, and other metals are dissolved in cold sulfuric acid, in which the silver does not dissolve. The silver can then be separated from the sulfuric acid containing the dissolved impurities according to means known in the art, and the silver residue recovered and sent to the ferric chloride-acid brine leach. The zinc can be recovered from the spent ferric chloride-acid brine leach solution by an ion adsorbing resin which removes the zinc as zinc chloride.

In one embodiment of the invention, the impurities in the ferric chloride-acid brine solution can be removed by way of a bleedstream in which about 5% to about 20% of the acid brine leach solution is continuously treated for impurity removal.

Referring to FIG. 1 which depicts a flow sheet showing one embodiment of the invention for the recovery of silver and gold, the feed material containing the gold and silver, typically from Merrill-Crowe precipitate 1, is sampled for percent moisture and percent metals, weighed, and thoroughly washed with water to remove any cyanide present. The weighed and washed feed material is then pretreated with an unheated ferric chloride-acid brine solution 3 to form a slurry 4 which is sent to the hot ferric chloride-acid brine leach solution 5. The hot acid brine leach will dissolve the silver and most metal impurities, but not the gold. The ferric chloride-acid brine leachate and the insoluble leach residue are separated 6 into a silver-containing ferric chloride-acid brine solution 8 and the solids containing the gold 7. Silver is recovered as silver chloride by cooling the ferric chloride-acid brine leachate 9 and then separating the silver chloride 11 from the solution 10. The silver chloride is washed and dried 12 and fed 13 to a fused salt electrolysis step 14 operating above the melting point of silver. The molten silver 15 is drawn off continuously and can be cast 17 into silver bars or shapes 18, and the chlorine gas 16 produced from the fused salt electrolysis step can be used advantageously in regenerating the ferric chloride-acid brine leach solution described below 25. Preferably, the ferric chloride-acid brine leach solution, after the removal of the silver chloride, is treated to remove excess impurities 20. Zinc dust 19 is added to the spent ferric chloride-acid brine leach solution to precipitate impurities such as copper, iron, and mercury. The spent solution 21 is separated from the precipitated solids 22. Zinc is then removed 23 from the solution by ion exchange to form a zinc chloride solution, 24, which may be sent to storage. The treated ferric chloride-acid brine leach solution is then regenerated by contacting the solution with chlorine gas 16, part of which is given off by the fused salt electrolysis of silver chloride 14. The regenerated ferric chloride-acid brine solution 26 may then be recycled to the leaching step 5. The solids 22 removed from impurity removal 20 may then be treated to recover any silver that may be present in the precipitate. The precipitate is first heated to oxidize the copper present and then cold sulfuric acid 28 is added to dissolve the impurities 27, leaving silver in the residue. After separating the silver residue from the dissolved impurities in the sulfuric acid, the silver may be recovered 29 as a solid 30 which is returned to the leach 5 for further recovery. The sulfuric acid with the dissolved impurities may be treated for further recovery of metals or sent to storage.

Gold contained in the solids 7 after the ferric chloride-acid brine leach may be recovered by dissolving the gold with hypochlorous acid 32 and then separating the residue 34 from the gold-containing hypochlorous leach solution. The gold is then recovered 35 by bubbling sulfur dioxide gas through the hypochlorous acid-gold solution to precipitate the gold. The gold is separated and can be sent to gold melting and casting 37 and subsequently made into gold bullion bars. The separated solution 38 may be recycled to the gold dissolution step 32.

As will be understood by those skilled in the art, modifications of the above process may be made without departing from the scope of the invention.

What is claimed is:

1. A process for recovering silver chloride from a feed material selected from the group consisting of Merrill-Crowe precipitates and precious metal electrolytic sludges containing silver and gold comprising the steps of:
    (a) sampling the feed material for percent metals;
    (b) leaching said feed material with a hot ferric chloride-acid brine solution in an amount and at a concentration, based on the percent metals in the feed material, such that a saturated solution of silver chloride will result from leaching said feed material without concomitant formation of a saturated solution of other metal salts;
    (c) separating said silver chloride-saturated leach solution from the solid residue;
    (d) cooling said silver chloride-saturated leach solution to precipitate silver chloride.

2. A process according to claim 1 wherein said precipitated silver chloride is further treated by fused salt electrolysis at a temperature at least as high as the melting point of silver to recover molten elemental silver therefrom.

3. A process according to claim 1 wherein said ferric chloride-acid brine leaching is conducted at a temperature of about 95° C.

4. A process according to claim 1 wherein said leach is conducted for a time from about five minutes to about six hours.

5. A process according to claim 1 wherein said feed material is pretreated with an unheated ferric chloride-acid brine leach solution to form a slurry and wherein said slurry is fed to said leaching step (a).

6. A process according to claim 1 wherein said ferric chloride-acid brine leach solution is regenerated and recycled.

7. A process according to claim 6, wherein said spent ferric chloride-acid brine leach solution is treated to remove impurities and then regenerated by contacting said spent acid brine leach solution with chlorine gas.

8. A process according to claim 7 wherein said chlorine gas comprises chlorine gas evolved during fused salt electrolysis of silver chloride.

9. A process according to claim 7 wherein impurities comprising copper are recovered from at least a portion of the spent ferric chloride-acid brine leach solution by cementation with zinc followed by a first liquid/solid separation, heating the solids to convert copper therein to copper oxide followed by leaching said solids to dissolve copper oxide, performing a second liquid/solid separation, and recovering the copper in the leach solution.

10. The process of claim 1 wherein the feed material contains gold and the solids of step (c) are further treated by:
    (a) contacting said solids with hypochlorous acid to dissolve the gold values therein;
    (b) separating said dissolved gold from said residue;
    (c) contacting the gold-containing solution with $SO_2$ to precipitate gold, and recovering said gold precipitate.

11. The process of claim 9 wherein zinc is recovered from the liquid of said first liquid/solid separation by ion exchange as zinc chloride.

12. The process of claim 1 wherein gold is recovered from the residue of step (c).

13. A process for recovering silver and gold values from a feed material selected from the group consisting of precious metal electrolytic sludges and Merrill-Crowe precipitates comprising:
    (a) sampling the feed material for percent metals;
    (b) leaching the feed material with a hot ferric chloride-acid brine solution in an amount and at a concentration, based on the percent metals in the feed materials, such that a saturated solution of silver chloride will result from leaching said feed material, without concomitant formation of a saturated solution of other metal salts;
    (c) separating said silver chloride-saturated leach solution from the solid residue containing the gold values;
    (d) cooling said silver chloride-saturated leach solution to precipitate silver as silver chloride;
    (e) treating said barren ferric chloride-acid brine leach solution of step (d) with zinc dust to precipitate impurities comprising copper;
    (f) separating the solids of step (e) from said leach solution and heating said solids to convert copper therein into copper oxide;
    (g) leaching said solids of step (f) with cold sulfuric acid to selectively dissolve oxidized base and ferrous metals;
    (h) separating said pregnant leach solution of step (g) from the residue and recovering copper therefrom;
    (i) subjecting said silver chloride of step (d) to fused salt electrolysis at a temperature at least as high as the melting point of silver to recover silver therefrom, in which electrolysis process chlorine gas is generated;
    (j) recycling said chlorine gas to the separated leach solution of step (f) to regenerate said leach solution and recycling said leach solution to step (b);
    (k) contacting said gold-containing residue of step (c) with hypochlorous acid to dissolve gold values;
    (l) separating said dissolved gold from said residue; and
    (m) contacting said gold-containing solution with sulfur dioxide to precipitate gold and recovering said gold precipitate.

* * * * *